US010591127B2

(12) United States Patent
Shiraishi

(10) Patent No.: US 10,591,127 B2
(45) Date of Patent: Mar. 17, 2020

(54) VEHICLE LUMINAIRE AND VEHICLE LAMP DEVICE

(71) Applicant: Toshiba Lighting & Technology Corporation, Yokosuka-shi, Kanagawa-ken (JP)

(72) Inventor: Hiromitsu Shiraishi, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 0 days.

(21) Appl. No.: 16/267,458

(22) Filed: Feb. 5, 2019

(65) Prior Publication Data

US 2019/0368677 A1 Dec. 5, 2019

(30) Foreign Application Priority Data

May 29, 2018 (JP) ................................ 2018-101959

(51) Int. Cl.

| | |
|---|---|
| ***B60Q 1/06*** | (2006.01) |
| ***F21S 41/19*** | (2018.01) |
| ***F21V 19/00*** | (2006.01) |
| ***F21V 29/503*** | (2015.01) |
| ***F21V 29/74*** | (2015.01) |

(52) U.S. Cl.

CPC ........ *F21S 41/192* (2018.01); *F21V 19/0045* (2013.01); *F21V 29/503* (2015.01); *F21V 29/74* (2015.01)

(58) Field of Classification Search

CPC .......... F21S 41/141; F21S 41/16; F21S 43/10; F21S 43/145; F21S 43/14; F21S 41/19; F21S 41/192; F21S 41/194; F21S 43/19; F21S 43/195

See application file for complete search history.

(56) References Cited

U.S. PATENT DOCUMENTS

2013/0215632 A1* 8/2013 Jackl .................... F21S 41/192 362/514
2015/0016136 A1 1/2015 Nakano et al.
2015/0325740 A1 11/2015 Serita et al.

(Continued)

FOREIGN PATENT DOCUMENTS

EP 3037715 A1 6/2016
EP 3285002 A1 2/2018
JP 2011-146483 A 7/2011

(Continued)

*Primary Examiner* — Matthew J. Peerce
(74) *Attorney, Agent, or Firm* — Banner & Witcoff, Ltd.

(57) ABSTRACT

A vehicle luminaire according to an embodiment includes: a flange; a mount portion provided on one side of the flange; a light-emitting unit that is provided on an end of the mount portion opposite to the flange side and includes at least one light-emitting element; a holder which is provided on another side of the flange and into which a connector is insertable; and at least one first thermal radiation fin that is provided on the another side of the flange and extends from a peripheral edge of the flange toward the holder. In a direction in which the holder projects from the flange, the position of an end face of the holder opposite to the flange side is different from the position of a holder-side end of an end face of the first thermal radiation fin opposite to the flange side.

19 Claims, 8 Drawing Sheets

(56) References Cited

U.S. PATENT DOCUMENTS

| | | | | |
|---|---|---|---|---|
| 2015/0338049 | A1* | 11/2015 | Cabanne | F21S 41/39<br>362/549 |
| 2016/0290621 | A1* | 10/2016 | Ozawa | F21S 43/195 |

FOREIGN PATENT DOCUMENTS

| | | | |
|---|---|---|---|
| JP | 2012-119243 | A | 6/2012 |
| JP | 2013-025935 | A | 2/2013 |
| JP | 2013-247061 | A | 12/2013 |
| JP | 2014-120446 | A | 6/2014 |
| JP | 2015-041452 | A | 3/2015 |
| JP | 2015-041454 | A | 3/2015 |
| WO | 2014/083122 | A1 | 6/2014 |

* cited by examiner

VEHICLE LUMINAIRE AND VEHICLE LAMP DEVICE

CROSS-REFERENCE TO RELATED APPLICATION

This application is based upon and claims the benefit of priority from Japanese Patent Application No. 2018-101959, filed on May 29, 2018, the entire contents of which are incorporated herein by reference.

FIELD

Embodiments described herein relate generally to a vehicle luminaire and a vehicle lamp device.

BACKGROUND

There is a vehicle luminaire that includes a socket and a light-emitting unit which is provided on one end side of the socket and has a light-emitting diode (LED).

Here, heat generated in the light-emitting unit radiates mainly from the socket to the outside. Therefore, a plurality of thermal radiation fins are provided on the other end side of the socket. In addition, a cylindrical holder, into which a connector is inserted, is provided on the other end side of the socket. In other words, the plurality of thermal radiation fins and the holder are provided to be aligned on the other end side of the socket.

When an operator installs the vehicle luminaire in a casing of a vehicle lamp device, the operator fits the vehicle luminaire into a hole of the casing and causes the vehicle luminaire to be held by the casing through twist-lock. In this manner, the operator inserts the connector into the hole of the holder, and thereby the vehicle luminaire, a power supply, and the like are electrically connected to each other. In this case, the hole of the holder is open on a rear side of the casing. Therefore, the operator on a front side of the casing may not be able to visually check the hole of the holder. In such a case, the operator fumbles around to recognize the position of the hole of the holder and tries to insert the connector into the hole of the holder.

However, when the connector is inserted into the hole of the holder, the operator takes a hand off the holder. Therefore, although the operator is able to recognize an approximate position of the hole of the holder, the operator is not able to recognize an accurate position of the hole of the holder. As a result, a long period of time may be taken for the operator to insert the connector into the hole of the holder.

In this respect, it is desired to develop a technology in which it is possible to improve controllability when the connector is inserted.

DETAILED DESCRIPTION

Figure 1:
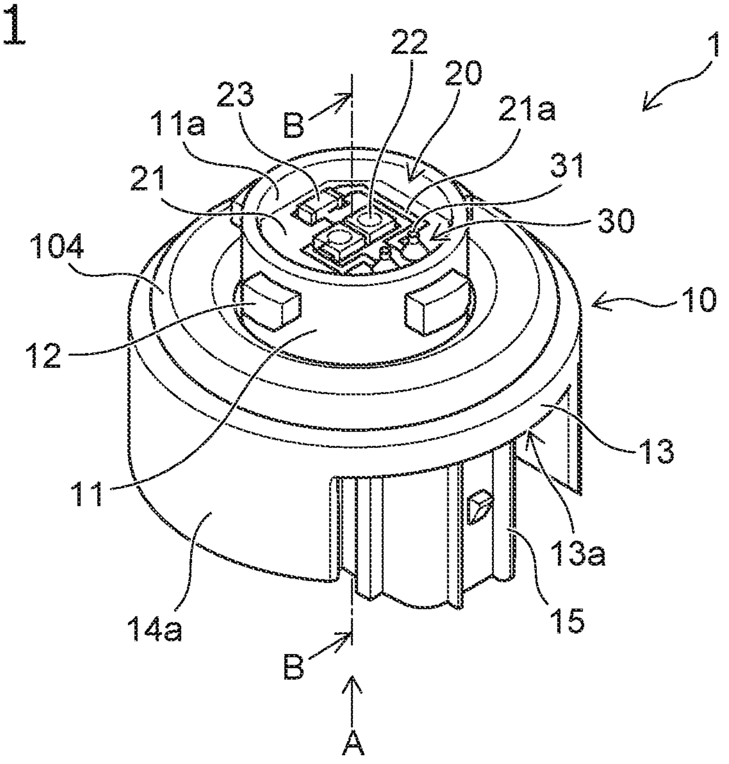
FIG. 1 is a perspective view for schematically exemplifying a vehicle luminaire according to an embodiment.

A vehicle luminaire according to an embodiment includes: a flange; a mount portion provided on one side of the flange; a light-emitting unit that is provided on an end of the mount portion opposite to the flange side and includes at least one light-emitting element; a holder which is provided on another side of the flange and into which a connector is insertable; and at least one first thermal radiation fin that is provided on the another side of the flange and extends from a peripheral edge of the flange toward the holder. In a direction in which the holder projects from the flange, the position of an end face of the holder opposite to the flange side is different from the position of a holder-side end of an end face of the first thermal radiation fin opposite to the flange side.

Hereinafter, embodiments are exemplified with reference to the drawings. Incidentally, in the drawings, the same reference signs are assigned to the same configurational elements, and the detailed description thereof is appropriately omitted.

(Vehicle Luminaire)

For example, a vehicle luminaire 1 according to the embodiment may be provided in an automobile or a rail vehicle. For example, as the vehicle luminaire 1 that is provided in an automobile, a luminaire that is used for a front combination light (for example, an appropriate combination of a daytime running lamp (DRL), a position lamp, a turn signal lamp, or the like) or a rear combination light (for example, an appropriate combination of a stop lamp, a tail lamp, a turn signal lamp, a back lamp, a fog lamp, or the like) can be exemplified. However, a use of the vehicle luminaire 1 is not limited thereto.

FIG. 1 is a perspective view for schematically exemplifying the vehicle luminaire 1 according to the embodiment.

Figure 2:
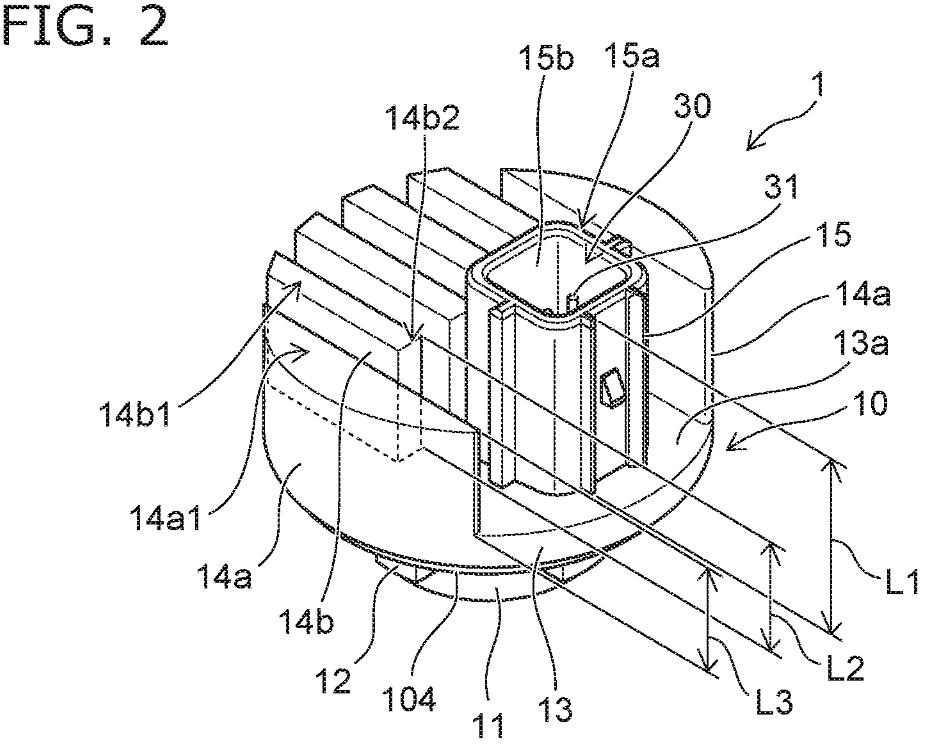
FIG. 2 is a perspective view schematically illustrating the vehicle luminaire viewed from an A direction.

FIG. 2 is a perspective view schematically illustrating the vehicle luminaire 1 in FIG. 1 when viewed from an A direction.

Figure 3:
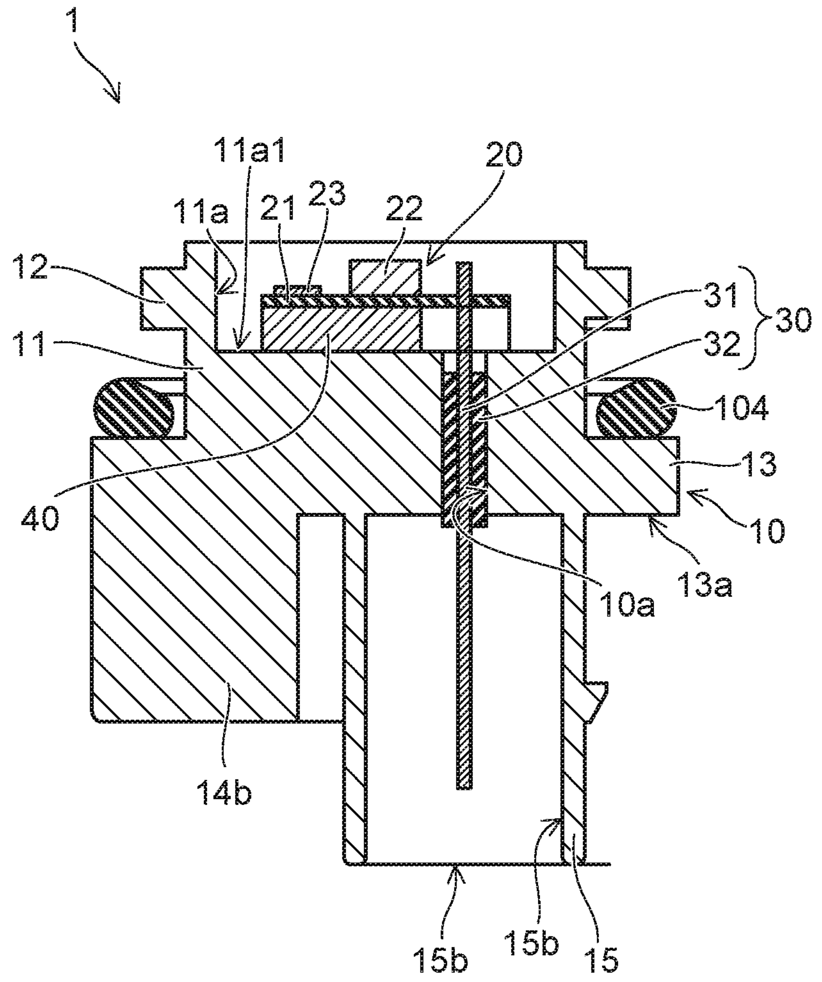
FIG. 3 is a sectional view taken along line B-B.

FIG. 3 is a sectional view taken along line B-B of the vehicle luminaire 1 in FIG. 1.

Figure 4:
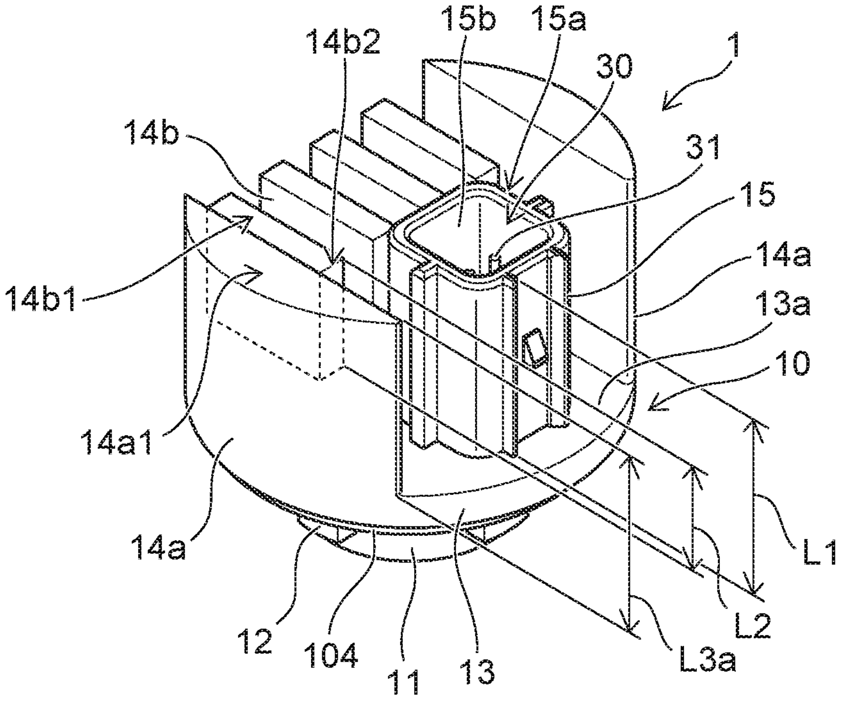
FIG. 4 is a perspective view for schematically exemplifying a thermal radiation fin according to another embodiment.

FIG. 4 is a perspective view for schematically exemplifying a thermal radiation fin 14*a* according to another embodiment.

As illustrated in FIGS. 1 to 3, the vehicle luminaire 1 includes a socket 10, a light-emitting unit 20, a power-supply unit 30, and a heat-conducting unit 40.

The socket 10 includes a mount portion 11, a bayonet 12, a flange 13, the thermal radiation fin 14*a* (corresponding to an example of a second thermal radiation fin), a thermal radiation fin 14*b* (corresponding to an example of a first thermal radiation fin), and a holder 15.

The mount portion 11 is provided on one side of the flange 13. The mount portion 11 may have a column-shaped external shape. For example, the mount portion 11 may have a circular column-shaped external shape. The mount portion 11 is provided with a recess 11*a* that is open to an end face of the mount portion opposite to the flange 13 side.

A plurality of bayonets 12 are provided on an outer surface of the mount portion 11. The plurality of bayonets 12 project toward an outer side of the vehicle luminaire 1. The plurality of bayonets 12 face the flange 13. The plurality of bayonets 12 are used when the vehicle luminaire 1 is installed in a casing 101 of a vehicle lamp device 100. The plurality of bayonets 12 are used for twist-lock.

The flange 13 has a plate shape. For example, the flange 13 may have a disk shape. An outer surface of the flange 13 is provided on a more outward side of the vehicle luminaire 1 than an outer surface of the bayonet 12.

The thermal radiation fins 14*a* and 14*b* are provided on the other side of the flange 13. The thermal radiation fins 14*a* and 14*b* are provided on a surface 13*a* of the flange 13 opposite to the side on which the mount portion 11 is provided. The thermal radiation fins 14*a* and 14*b* may have a plate shape.

The thermal radiation fin 14*a* extends along a peripheral edge of the flange 13. Two of the thermal radiation fins 14*a* may be provided to face each other. The thermal radiation fin 14*a* extends along the peripheral edge of the flange 13 and is provided in a direction intersecting a direction in which the thermal radiation fin 14*b* and the holder 15 are aligned.

At least one thermal radiation fin 14*b* may be provided. A plurality of the thermal radiation fins 14*b* may be provided to be parallel to each other. The thermal radiation fin 14*b* extends from the peripheral edge of the flange 13 toward a central region of the flange 13. The thermal radiation fin 14*b* extends from the peripheral edge of the flange 13 toward the holder 15. The thermal radiation fin 14*b* may be provided to be aligned with the thermal radiation fin 14*a*. The thermal radiation fin 14*b* is provided between the thermal radiation fin 14*a* and the thermal radiation fin 14*a*.

The holder 15 is provided on the other side of the flange 13. The holder 15 may be provided on the surface 13*a* of the flange 13 on which the thermal radiation fins 14*a* and 14*b* are provided. The holder 15 is provided between the thermal radiation fin 14*a* and the thermal radiation fin 14*a*. The holder 15 may be provided to be aligned with the thermal radiation fin 14*b* in a direction intersecting a direction in which the two thermal radiation fins 14*a* are aligned. The holder 15 may be provided between the center and a peripheral edge of the surface 13*a* of the flange 13. In this case, the thermal radiation fin 14*b* may be provided on one side of the holder 15. Incidentally, the holder 15 may be provided in the central region of the surface 13*a* of the flange 13. In this case, the thermal radiation fins 14*b* may be provided on both sides of the holder 15.

A connector 105 is insertable into the holder 15. The holder 15 has a cylindrical shape and is provided with a hole 15*b* inside. The connector 105 including a seal member 105*a* is inserted into the hole 15*b*. Therefore, the cross-sectional shape and dimensions of the hole 15*b* are set in accordance with the cross-sectional shape and dimensions of the connector 105 including the seal member 105*a*.

As illustrated in FIG. 2, the distance L1 between the surface 13*a* and an end face 15*a* of the holder 15 opposite to the flange 13 side may be longer than the distance L3 between the surface 13*a* and an end face 14*a*1 of the thermal radiation fin 14*a* opposite to the flange 13 side (L1>L3).

In addition, as illustrated in FIG. 4, the distance L3*a* may be equal to the distance L1 or longer than the distance L1 (L1≤L3*a*).

In addition, the distance L1 is longer than the distance L2 between the surface 13*a* and an end 14*b*2 on the holder 15 side of an end face 14*b*1 of the thermal radiation fin 14*b* opposite to the flange 13 side (L1>L2).

In this case, as illustrated in FIGS. 2 and 4, the end face 14*b*1 of the thermal radiation fin 14*b* may be a flat surface. When the end face 14*b*1 is the flat surface, the distance L2 may be the distance between the end face 14*b*1 and the surface 13*a*.

In other words, the end face 15*a* of the holder 15 projects from at least the end 14*b*2 of the thermal radiation fin 14*b*.

Here, an installation procedure of a vehicle luminaire 200 in the casing 101 of the vehicle lamp device 100 according to a comparative example is described.

Figure 5:
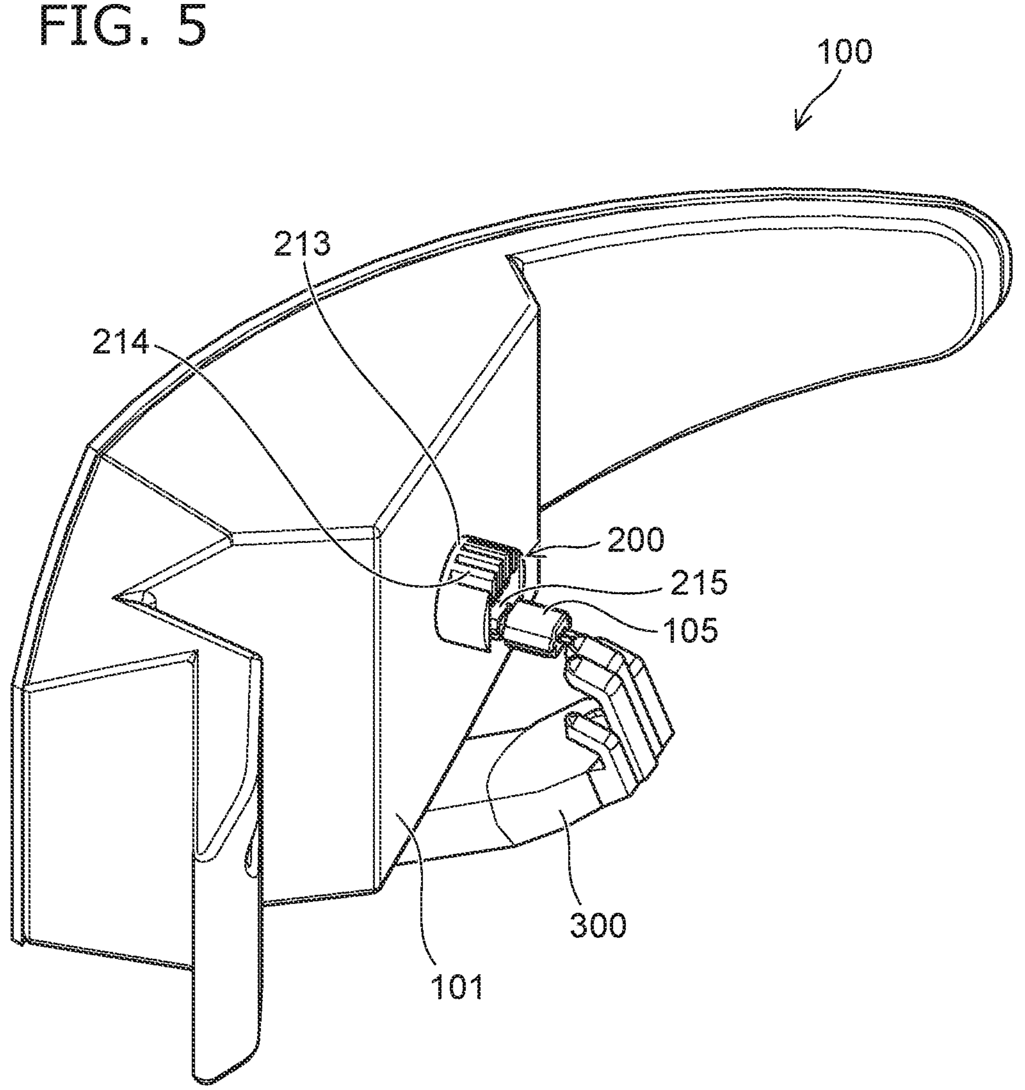
FIG. 5 is a perspective view for schematically exemplifying an installation procedure of a vehicle luminaire according to a comparative example.

FIG. 5 is a perspective view for schematically exemplifying an installation procedure of the vehicle luminaire 200 according to the comparative example.

As illustrated in FIG. 5, the vehicle luminaire 200 includes a plurality of thermal radiation fins 214 and a holder 215. In addition, an end face of the holder 215 opposite to the flange 213 side is disposed at the same position as an end face of the thermal radiation fin 214 opposite to the flange 213 side. In other words, the end face of the holder 215 does not project from the end face of the thermal radiation fin 214.

When the vehicle luminaire 200 is installed in the casing 101 of the vehicle lamp device 100, an operator 300 fits the vehicle luminaire 200 into a hole of the casing 101 and causes the vehicle luminaire 200 to be held by the casing 101 through twist-lock. Next, the operator 300 inserts the connector 105 into a hole of the holder 215, and thereby the vehicle luminaire 200, a power supply, and the like are electrically connected to each other.

In this case, the hole of the holder 215 is open on a rear side (inside of the vehicle) of the casing 101. Therefore, the operator 300 on a front side (outside of the vehicle) of the casing 101 may not be able to visually check the hole of the holder 215. When the operator 300 is not able to see the hole of the holder 215, the operator fumbles around to recognize the position of the hole of the holder 215 and tries to insert the connector 105 into the hole of the holder 215.

However, when the connector 105 is inserted into the hole of the holder 215, the operator 300 takes a hand off the holder 215. Therefore, although the operator is able to recognize an approximate position of the hole of the holder 215, the operator is not able to recognize an accurate position of the hole of the holder 215. As a result, a long period of time may be taken for the operator 300 to insert the connector 105 into the hole of the holder 215.

Figure 6:
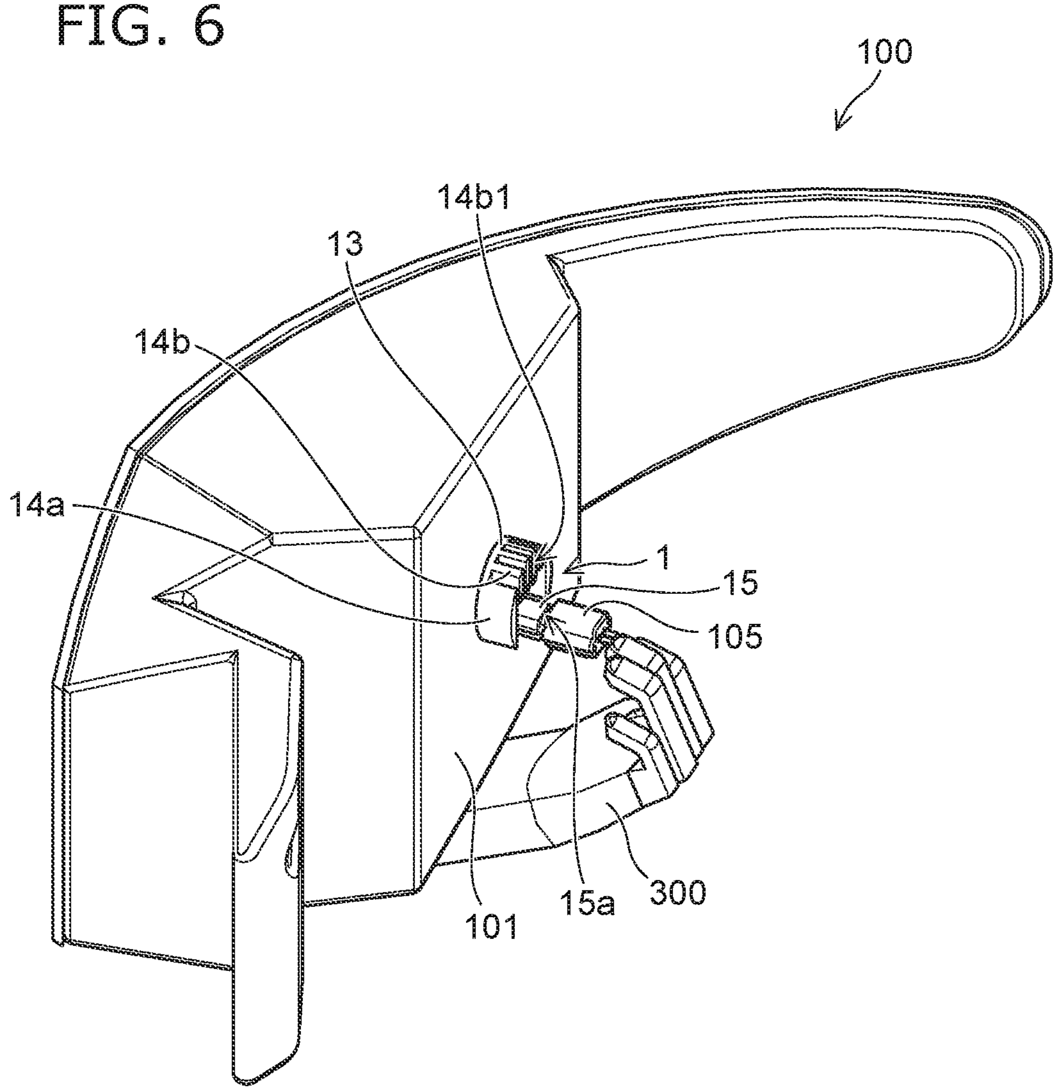
FIG. 6 is a perspective view for schematically exemplifying an installation procedure of the vehicle luminaire according to the embodiment.

FIG. 6 is a perspective view for schematically exemplifying an installation procedure of the vehicle luminaire 1 according to the embodiment.

As described above, in the vehicle luminaire 1, the end face 15*a* of the holder 15 projects from at least the end 14*b*2 of the thermal radiation fin 14*b*. In this case, as illustrated in FIG. 6, the holder 15 may project from the thermal radiation fin 14*b*.

When the operator 300 inserts the connector 105 into the hole 15*b* of the holder 15, the operator 300 causes a distal end of the held connector 105 to come into contact with the end face **14*b*1 of the thermal radiation fin 14*b* or the end face 14*a*1 of the thermal radiation fin 14*a* and, in this state, causes the connector 105 to move such that the operator is able to recognize a position, at which the connector 105 is in contact with a side surface of the holder 15, as the position of the holder 15. In this manner, the operator 300 causes the connector 105 to move along the side surface of the holder 15 in a state in which the distal end of the connector 105 is caused to come into contact with the side surface of the holder 15, thereby, being able to easily know the position of the end face 15*a* of the holder 15 and, eventually, the hole 15*b* of the holder 15**.

As illustrated in FIG. 2, when "L1>L2" and "L1>L3", the operator 300 can cause the connector 105 to approach the holder 15 from two directions. Therefore, even when a member is disposed in the vicinity of the vehicle luminaire 1, the operator 300 easily inserts the connector 105 into the hole **15*b* of the holder 15**.

As illustrated in FIG. 4, when "L1>L2" and "L1≤L**3*a*", the operator 300 can cause the connector 105 to move between the thermal radiation fin 14*a* and the thermal radiation fin 14*a*. In other words, the thermal radiation fin 14*a* functions as a guide when the connector 105 is guided to the holder 15**.

In addition, when "L1≤L**3*a*", it is possible to increase a surface area of the thermal radiation fin 14*a***, and thus it is possible to improve a thermal radiation property.

Heat generated in the light-emitting unit 20 is mainly transmitted to the thermal radiation fins **14*a* and 14*b* via the heat-conducting unit 40, the mount portion 11, and the flange 13. The heat transmitted to the thermal radiation fins 14*a* and 14*b* is mainly released to the outside from the thermal radiation fins 14*a* and 14*b***.

Therefore, with consideration for transmission of the heat generated in the light-emitting unit 20 to the outside, it is preferable that the socket 10 is made of a material having a high heat conductivity. An example of the material having high heat conductivity may include a high thermal conductivity resin or the like. For example, the high thermal conductivity resin is obtained by mixing fillers using an inorganic material with a resin such as polyethylene terephthalate (PET) or nylon. An example of the inorganic material may include ceramics such as aluminum oxide, carbon, or the like.

For example, it is possible to integrally mold the mount portion 11, the bayonet 12, the flange 13, the thermal radiation fin **14*a*, the thermal radiation fin 14*b*, and the holder 15** through an injection molding method or the like.

When the socket 10 includes the mount portion 11, the bayonet 12, the flange 13, the thermal radiation fin **14*a*, the thermal radiation fin 14*b*, and the holder 15 which contain the high thermal conductivity resin and are integrally molded, it is possible to efficiently dissipate the heat generated in the light-emitting unit 20. In addition, it is possible to reduce a weight of the socket 10**.

The light-emitting unit 20 (board 21) is provided on an end of the mount portion 11 opposite to the flange 13 side.

The light-emitting unit 20 includes the board 21, a light-emitting element 22, and a resistance 23.

The board 21 has a plate shape. For example, a planar shape of the board 21 may be a quadrangle. A material or a structure of the board 21 is not particularly limited. For example, the board 21 may be made of an inorganic material such as ceramics (for example, aluminum oxide or aluminum nitride), an organic material such as paper phenol or glass epoxy, or the like. In addition, the board 21 may be obtained by covering a surface of a metal plate with an insulating material. Incidentally, when the surface of the metal plate is covered with the insulating material, the insulating material may be made of an organic material or an inorganic material. When the light-emitting element 22 has a large amount of heat generation, it is preferable that the board 21 is formed by using a material having high heat conductivity from the viewpoint of thermal radiation. Examples of the material having high heat conductivity may include ceramics such as aluminum oxide or aluminum nitride, a high thermal conductivity resin, a material obtained by covering a surface of a metal plate with an insulating material, or the like. In addition, the board 21 is formed by a single layer or multiple layers.

In addition, a wiring pattern **21*a* is provided on a surface of the board 21. For example, the wiring pattern 21*a* may be made of a material containing silver as a main component. For example, the wiring pattern 21*a* may be made of silver or a silver alloy. However, the material of the wiring pattern 21*a* is not limited to the material containing silver as the main component. For example, the wiring pattern 21*a*** may be made of a material containing copper as a main component.

The light-emitting element 22 is provided on a surface of the board 21 opposite to the heat-conducting unit 40 side (socket 10 side). The light-emitting element 22 is provided on the board 21. The light-emitting element 22 is electrically connected with the wiring pattern **21*a* provided on the surface of the board 21. For example, the light-emitting element 22 may be a light-emitting diode, an organic light-emitting diode, a laser diode, or the like. At least one light-emitting element 22 may be provided. Hereinafter, the case of providing a plurality of the light-emitting elements 22 is exemplified. The plurality of light-emitting elements 22 may be connected to each other in series. In addition, the light-emitting elements 22 are connected with the resistance 23** in series.

For example, the light-emitting element 22 may be a surface installation type such as a plastic leaded chip carrier (PLCC) type of light-emitting element. Incidentally, the light-emitting element 22 may be a light-emitting element having a shell type or the like of lead wire, for example. Incidentally, the light-emitting element 22 exemplified in FIG. 1 is the surface installation type of light-emitting element.

In addition, the light-emitting element 22 may also be installed by the chip-on-board (COB). When the light-emitting element 22 is installed by COB, the light-emitting element 22 having a chip shape, wiring for electrically connecting the light-emitting element 22 and the wiring pattern **21*a*, a frame-shaped member surrounding the light-emitting element 22 and the wiring, a sealing portion provided inside the frame-shaped member, or the like may be provided on the board 21. In this case, the frame-shaped member can have a function of setting a forming range of the sealing portion and function as a reflector. In addition, the sealing portion may contain a phosphor. An example of the phosphor may include an yttrium-aluminum-garnet-based phosphor (YAG-based phosphor) or the like. Incidentally, it is possible to provide only the sealing portion without providing the frame-shaped member. When only the sealing portion is provided, a dome-shaped sealing portion is provided on the board 21**.

An emission surface of light of the light-emitting element 22 faces a front surface side of the vehicle luminaire 1. The light-emitting element 22 mainly emits light toward the front surface side of the vehicle luminaire 1.

The number, a size, disposition, or the like of the light-emitting elements 22 is not limited to the exemplified example and may be appropriately modified depending on the size, use, or the like of the vehicle luminaire 1.

The resistance 23 is provided on the surface of the board 21 opposite to the heat-conducting unit 40 side (socket 10 side). The resistance 23 is provided on the board 21. The resistance 23 is electrically connected with the wiring pattern 21*a* provided on the surface of the board 21. Examples of the resistance 23 may include a surface installation type of resistance unit, a resistance unit having a lead wire (metal oxide coated resistance unit), a filmy resistance unit formed by using a screen printing method, or the like. Incidentally, the resistance 23 exemplified in FIG. 1 is the surface installation type of resistance.

An example of a material of the filmy resistance may include ruthenium oxide ($RuO_2$). For example, the filmy resistance may be formed by the screen printing method and a baking method. In addition, when the resistance 23 is the filmy resistance unit, it is possible to increase a contact area between the resistance 23 and the board 21, and thus it is possible to improve the thermal radiation property. In addition, it is possible to form a plurality of the resistances 23 at once. Therefore, it is possible to improve productivity, and it is possible to suppress variation in resistance values of the plurality of resistances 23.

Here, variation occurs in a forward voltage characteristic of the light-emitting element 22. Therefore, when constant voltage is applied between an anode terminal and a ground terminal, and thus variation occurs in brightness (light flux, luminance, light intensity, illuminance) of light that radiates from the light-emitting element 22. Therefore, a value of a current that flows in the light-emitting element 22 is adjusted to be set within a predetermined range by the resistance 23 such that the brightness of light that radiates from the light-emitting element 22 is set within a predetermined range. In this case, a resistance value of the resistance 23 is changed, and thereby the value of the current that flows in the light-emitting element 22 is to be set within the predetermined range.

when the resistance 23 is the surface installation type of resistance unit, the resistance unit having the lead wire, or the like, the resistance 23 having a resistance value suitable for the forward voltage characteristic of the light-emitting element 22 is selected.

When the resistance 23 is the filmy resistance unit, it is possible to increase the resistance value if a part of the resistance 23 is removed. For example, if the resistance 23 is irradiated with laser light, it is possible to easily remove a part of the resistance 23.

The number, a size, disposition, or the like of the resistances 23 is not limited to the exemplified example and may be appropriately modified depending on the number, specifications, or the like of the light-emitting elements 22.

Otherwise, in order to prevent a reverse voltage from being applied to the light-emitting element 22 and in order to prevent pulse noise from being applied to the light-emitting element 22 from a reverse direction, it is also possible to provide a diode. In addition, in order to detect disconnection of the light-emitting element 22 or prevent false lighting, it is possible to provide a pull-down resistance. In addition, it is also possible to provide a covering portion that covers the wiring pattern 21*a*, the filmy resistance, or the like. For example, the covering portion may contain a glass material.

The power-supply unit 30 includes a power-supply terminal 31 and an insulating portion 32.

The power-supply terminal 31 may be a rod-shaped body. The power-supply terminal 31 projects from a bottom surface 11*a*1 of the recess 11*a*. A plurality of the power-supply terminals 31 are provided. The plurality of the power-supply terminals 31 may be provided to be aligned in a predetermined direction. The plurality of power-supply terminals 31 are provided inside the insulating portion 32. The plurality of power-supply terminals 31 extend through inside the insulating portion 32 and project from an end face of the insulating portion 32 on the light-emitting unit 20 side and an end face of the insulating portion 32 on the holder 15 side. Ends of the plurality of power-supply terminals 31 on the light-emitting unit 20 side are electrically and mechanically connected with the wiring pattern 21*a* provided on the board 21. In other words, one end of the power-supply terminal 31 is soldered to the wiring pattern 21*a*. Ends of the plurality of power-supply terminals 31 on the holder 15 side are exposed to the inside of the hole 15*b*. The connectors 105 is fit to the plurality of power-supply terminals 31 that are exposed to the inside of the hole 15*b*. The power-supply terminal 31 has conductivity. For example, the power-supply terminal 31 may be made of metal such as a copper alloy. Incidentally, the number, a shape, disposition, or the like of the power-supply terminal 31 is not limited to the exemplified example and may be appropriately modified.

When a material of the socket 10 is a high thermal conductivity resin containing fillers made of carbon, the socket 10 has conductivity. Therefore, the insulating portion 32 is provided between the power-supply terminal 31 and the socket 10 having conductivity so as to insulate the power-supply terminal and the socket from each other. In addition, the insulating portion 32 also has a function of holding the plurality of power-supply terminals 31. Incidentally, when the socket 10 is made of a high thermal conductivity resin (for example, a high thermal conductivity resin containing fillers made of ceramics) having an insulation property, it is possible to omit the insulating portion 32. In this case, the socket 10 holds the plurality of power-supply terminals 31.

The insulating portion 32 is provided between the plurality of power-supply terminals 31 and the socket 10. The insulating portion 32 has the insulation property. The insulating portion 32 may be made of a resin having the insulation property. For example, the insulating portion 32 may be made of PET, nylon, or the like. The insulating portion 32 is provided inside a hole 10*a* provided in the socket 10.

The heat-conducting unit 40 is provided between the board 21 and the bottom surface 11*a*1 of the recess 11*a*. The heat-conducting unit 40 is provided on the bottom surface 11*a*1 of the recess 11*a* via an adhesion portion. In other words, the heat-conducting unit 40 adheres to the bottom surface 11*a*1 of the recess 11*a*. An adhesive for adhering of the heat-conducting unit 40 to the bottom surface 11*a*1 of the recess 11*a* is preferably an adhesive having high heat conductivity. For example, the adhesive may be an adhesive in which fillers obtained by using an inorganic material are mixed. It is preferable that the inorganic material is a material having high heat conductivity (for example, ceramics such as aluminum oxide or aluminum nitride). For example, the heat conductivity of the adhesive may be 0.5 W/(m·k) or higher and 10 W/(m·k) or lower.

In addition, the heat-conducting unit 40 may also be buried in the bottom surface 11*a*1 of the recess 11*a* by an insert molding method. In addition, the heat-conducting unit 40 may be installed in the bottom surface 11*a*1 of the recess 11*a* via a layer made of heat conductive grease (thermal radiation grease). A type of heat conductive grease is not particularly limited, and grease obtained by mixing fillers made of a material having high heat conductivity (for example, ceramics such as aluminum oxide or aluminum nitride) may be used, for example. For example, the heat conductivity of the heat conductive grease may be 1 W/(m·k) or higher and 5 W/(m·k) or lower.

The heat-conducting unit 40 is provided to cause the heat generated in the light-emitting unit 20 to be easily transmitted to the socket 10. Therefore, it is preferable that the heat-conducting unit 40 is made of a material having high heat conductivity. The heat-conducting unit 40 may have a plate shape and be made of metal such as aluminum, an aluminum alloy, copper, or a copper alloy, for example.

Here, when the vehicle luminaire is provided in an automobile, a temperature in a use environment is −40° C. to 85° C. Therefore, when the heat generated in the light-emitting unit 20 is not sufficiently released, there is a concern that the temperature of the light-emitting element 22 will increase, a service life of the light-emitting element 22 will be shortened, or a function of the light-emitting element 22 will be degraded.

As described above, the socket 10 and the heat-conducting unit 40 are made of the material having the high heat conductivity. Therefore, it is possible to suppress an immoderate increase in temperature of the light-emitting element 22.

Figure 7:
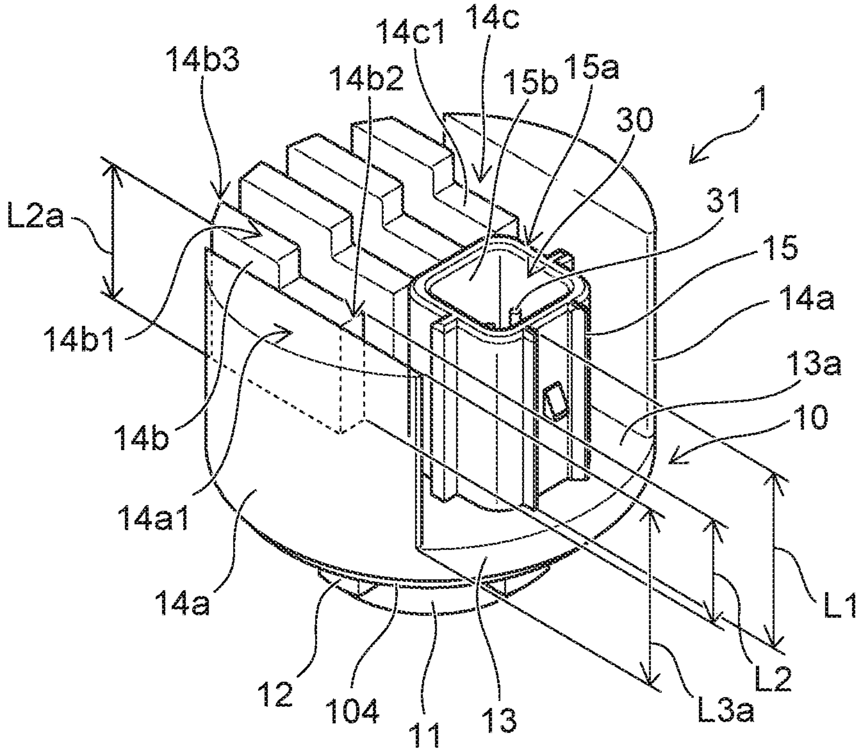
FIG. 7 is a perspective view for schematically exemplifying a thermal radiation fin according to still another embodiment.

FIG. 7 is a perspective view for schematically exemplifying the thermal radiation fin 14*b* according to still another embodiment.

As illustrated in FIG. 7, the distance L2*a* between the surface 13*a* and an end 14*b*3 of the end face 14*b*1 of the thermal radiation film 14*b* opposite to the holder 15 side and opposite to the flange 13 side may be longer than the distance L2 (L2*a*>L2). For example, as illustrated in FIG. 7, a step portion 14*c* is provided on the end face 14*b*1 of the thermal radiation fin 14*b*, and a height (distance L2) of the thermal radiation fin 14*b* on the holder 15 side may be lower than a height (distance L2*a*) thereof opposite to the holder 15 side.

When the step portion 14*c* is provided, it is easier to recognize the position of the holder 15. For example, the operator 300 causes the distal end of the held connector 105 to come into contact with the end face 14*b*1 of the thermal radiation fin 14*b* or the end face 14*a*1 of the thermal radiation fin 14*a* and, in this state, causes the connector 105 to move such that the connector 105 comes into contact with a surface 14*c*1 of the step portion 14*c*. The holder 15 is provided in the vicinity of the step portion 14*c*, the operator 300 recognizes the position of the holder 15 more easily. Therefore, the operator 300 inserts the connector 105 into the hole 15*b* of the holder 15 more easily.

In addition, it is possible to increase the distance L3*a* and the distance L2*a*, and thus it is possible to increase surface areas of the thermal radiation fins 14*a* and 14*b*. Therefore, it is possible to improve the thermal radiation property.

Figure 8:
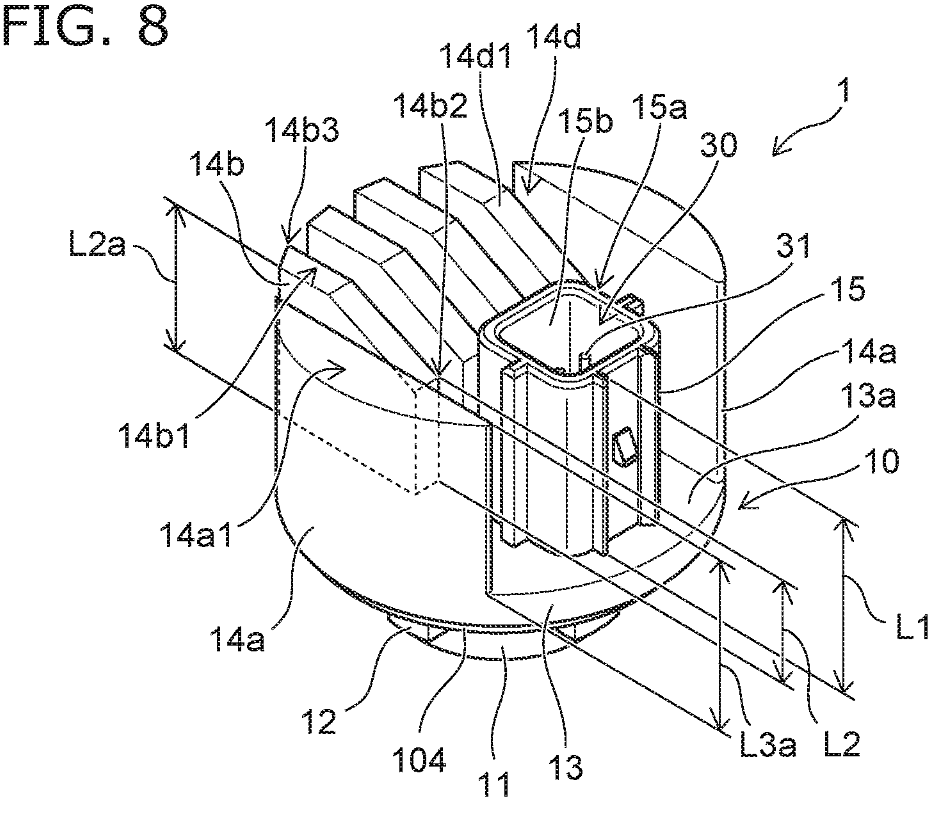
FIG. 8 is a perspective view for schematically exemplifying a thermal radiation fin according to still another embodiment.

FIG. 8 is a perspective view for schematically exemplifying the thermal radiation fin 14*b* according to still another embodiment.

As illustrated in FIG. 8, the distance L2*a* between the surface 13*a* and the end 14*b*3 of the end face 14*b*1 of the thermal radiation fin 14*b* opposite to the holder 15 side and opposite to the flange 13 side may be longer than the distance L2 (L2*a*>L2). For example, as illustrated in FIG. 8, an inclined portion 14*d* (corresponding to an example of a first inclined portion) is provided on the end face 14*b*1 of the thermal radiation fin 14*b*, and a height (distance L2*a*) of the thermal radiation fin 14*b* on the holder 15 side may be lower than the height (distance L2*a*) thereof opposite to the holder 15 side.

When the inclined portion 14*d* is provided, it is easier to recognize the position of the holder 15. For example, the operator 300 causes the distal end of the held connector 105 to come into contact with the end face 14*b*1 of the thermal radiation fin 14*b* or the end face 14*a*1 of the thermal radiation fin 14*a* and, in this state, causes the connector 105 to move such that the connector 105 comes into contact with a surface 14*d*1 of the inclined portion 14*d*. The surface 14*d*1 of the inclined portion 14*d* is inclined toward the holder 15, and thereby the operator 300 recognizes the position of the holder 15 more easily. Therefore, the operator 300 inserts the connector 105 into the hole 15*b* of the holder 15 more easily.

In addition, it is possible to increase the distance L3*a* and the distance L2*a*, and thus it is possible to increase surface areas of the thermal radiation fins 14*a* and 14*b*. Therefore, it is possible to improve the thermal radiation property.

Figure 9:
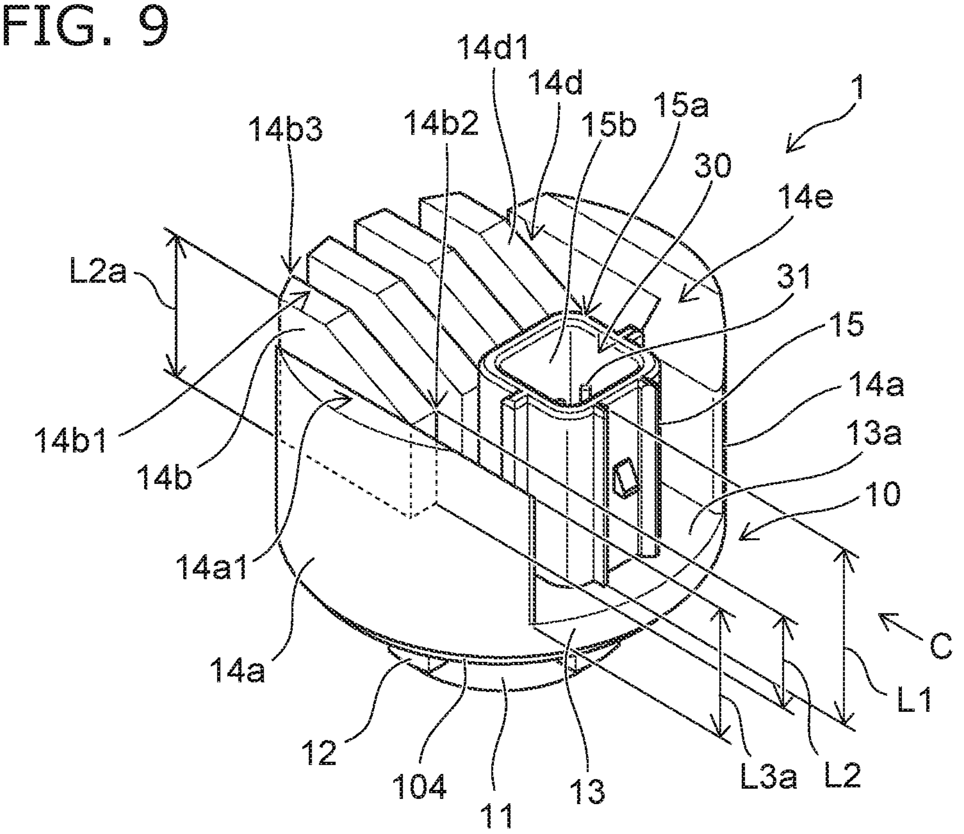
FIG. 9 is a perspective view for schematically exemplifying a thermal radiation fin according to still another embodiment.

FIG. 9 is a perspective view for schematically exemplifying the thermal radiation fin 14*a* according to still another embodiment.

Figure 10:
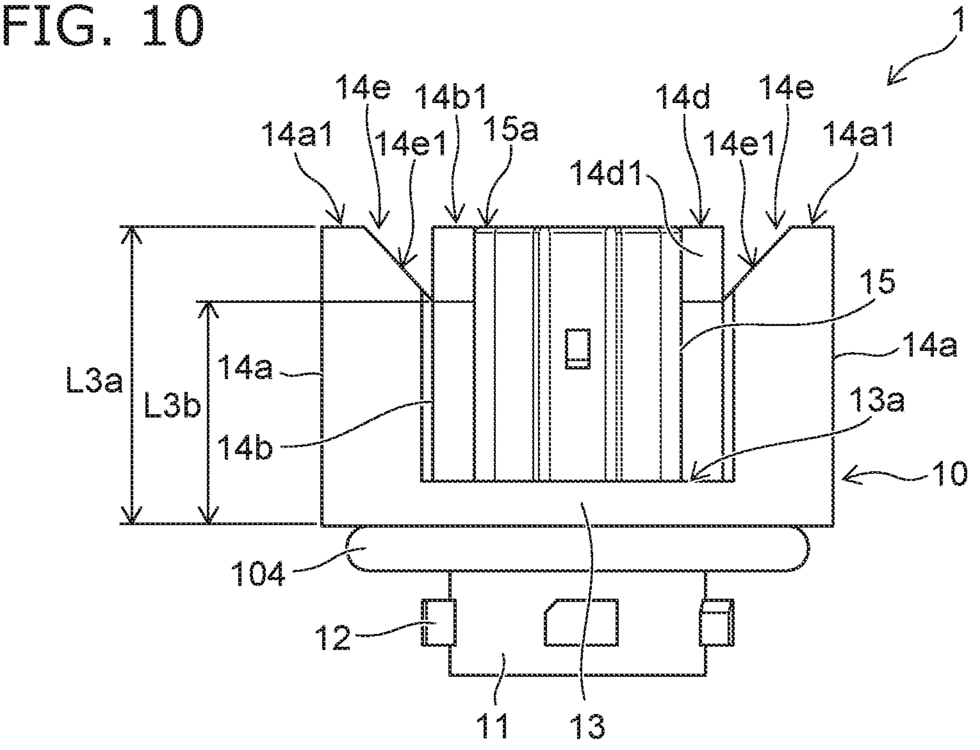
FIG. 10 is a schematic view of a vehicle luminaire in FIG. 9 when viewed from a C direction.

FIG. 10 is a schematic view of the vehicle luminaire 1 in FIG. 9 when viewed from a C direction.

As illustrated in FIGS. 9 and 10, it is possible to provide an inclined portion 14*e* (corresponding to an example of a second inclined portion) on the holder 15 side of the end face 14*a*1 of the thermal radiation fin 14*a* opposite to the flange 13 side.

In this manner, as illustrated in FIG. 9, the inclined portion 14*e* is provided, and thereby a height (distance L3*b*) of the thermal radiation fin 14*a* on the holder 15 side may be lower than a height (distance L3*a*) thereof opposite to the holder 15 side.

When the inclined portion 14*e* is provided, it is easier to recognize the position of the holder 15. For example, the operator 300 causes the distal end of the held connector 105 to come into contact with the end face 14*a*1 of the thermal radiation fin 14*a* and, in this state, causes the connector 105 to move such that the connector 105 comes into contact with the surface 14*e*1 of the inclined portion 14*e*. The surface 14*e*1 of the inclined portion 14*e* is inclined toward the holder 15, and thereby the operator 300 recognizes the position of the holder 15 more easily. Therefore, the operator 300 inserts the connector 105 into the hole 15*b* of the holder 15 more easily.

In addition, it is possible to increase the distance L3*a* and the distance L2*a*, and thus it is possible to increase surface areas of the thermal radiation fins 14*a* and 14*b*. Therefore, it is possible to improve the thermal radiation property.

Incidentally, FIGS. 9 and 10 exemplify a case where the inclined portion 14*e* is provided on the thermal radiation fin 14*a* of the vehicle luminaire exemplified in FIG. 8; however, the embodiment is not particularly limited thereto. For example, it is possible to provide the inclined portion 14*e* on the thermal radiation fin 14*a* of the vehicle luminaire exemplified in FIGS. 4 and 7.

Figure 11:
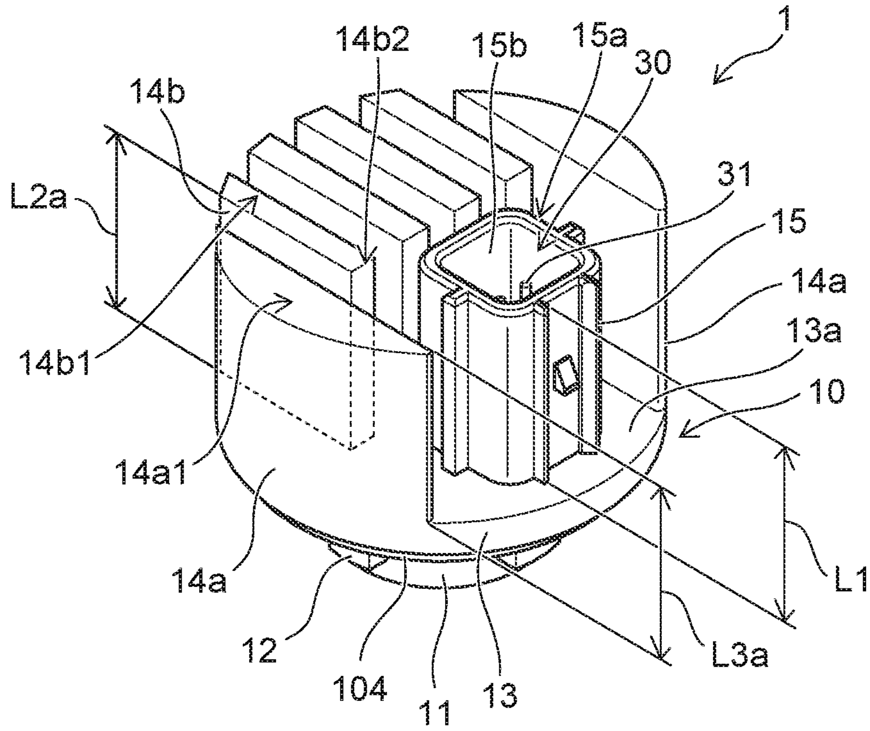
FIG. 11 is a perspective view for schematically exemplifying a thermal radiation fin according to still another embodiment.

FIG. 11 is a perspective view for schematically exemplifying the thermal radiation fins 14*a* and 14*b* according to still another embodiment.

As illustrated in FIG. 11, the distance L2*a* may be longer than the distance L1 (distance L2*a*>distance L1), and the distance L3*a* may be longer than the distance L1 (distance L3*a*>distance L1). In other words, the end face 15*a* of the holder 15 is provided to be closer to the flange 13 side than the end face 14*a*1 of the thermal radiation fin 14*a* and the end face 14*b*1 of the thermal radiation fin 14*b*.

Also in this manner, the operator 300 recognizes the position of the holder 15 easily. For example, the operator 300 causes the distal end of the held connector 105 to come into contact with the end face **14*a*1 of the thermal radiation fin 14*a* or the end face 14*b*1 of the thermal radiation fin 14*b* and, in this state, causes the connector 105 to move. The end face 15*a* of the holder 15 is provided to be closer to the flange 13 side than the end face 14*a*1 and the end face 14*b*1, and thereby the operator 300 is able to easily recognize the position of the end face 15*a* of the holder 15 and, eventually, the position of the hole 15*b* of the holder 15**.

As described above, in a direction in which the holder 15 projects from the flange 13, the position of the end face **15*a* of the holder 15 opposite to of the flange 13 side may be different from the position of the end 14*b*2 on the holder 15 side of the end face 14*b*1 of the thermal radiation fin 14*b* opposite to the flange 13** side.

However, as described above, when the end face **15*a* of the holder 15 projects from at least the end 14*b*2 of the thermal radiation fin 14*b*, it is possible to cause the distal end of the connector 105 to come into contact with the side surface of the holder 15. Therefore, it is easy to recognize the accurate position of the holder 15, and thus the operator 300 inserts the connector 105 into the hole 15*b* of the holder 15** easily.

Here, a height (distance L1) of the holder 15 is substantially determined depending on the specifications of the connector 105. Therefore, as described above, when the end face **15*a* of the holder 15 projects from at least the end 14*b*2 of the thermal radiation fin 14*b*, there is a concern that a surface area of the thermal radiation fin 14*b*** will decrease and, thus, the thermal radiation property will be degraded.

Table 1 is provided for showing a relationship between the distance L1 and the distance L2 and the thermal radiation property.

TABLE 1

| | Vehicle luminaire in FIG. 5 | Vehicle luminaire in FIG. 8 | Vehicle luminaire in FIG. 7 | Vehicle luminaire in FIG. 2 |
|---|---|---|---|---|
| L2 | 17 mm | 12 mm | 12 mm | 12 mm |
| L1 | 17 mm | 17 mm | 17 mm | 17 mm |
| Junction temperature of light-emitting element 22 | T° C. | T° C. + 0.3° C. | T° C. + 0.3° C. | T° C. + 0.5° C. |

As shown in Table 1, even when distance L2/distance L1 is about 0.7, an increase in junction temperature of the light-emitting element 22 may be 0.5° C. or lower.

In other words, even when the end face **15*a* of the holder 15 projects from the end 14*b*2 of the thermal radiation fin 14*b***, the thermal radiation property is not significantly degraded.

(Vehicle Lamp Device)

Next, the vehicle lamp device 100 will be exemplified.

A description will be given of an example where the vehicle lamp device 100 is a front combination light to be provided in an automobile. However, the vehicle lamp device 100 is not limited to the front combination light to be provided in an automobile. The vehicle lamp device 100 may be any type of vehicle lamp device to be provided in an automobile, a rail vehicle, or any other vehicle.

Figure 12:
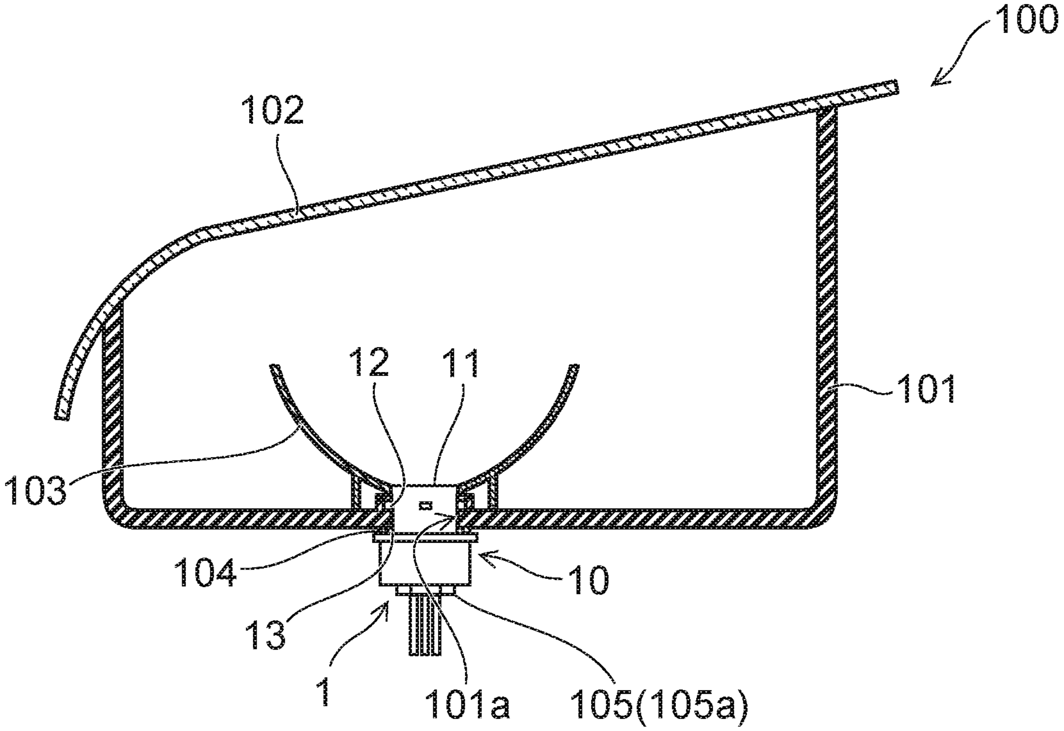
FIG. 12 is a partial sectional view for schematically exemplifying a vehicle lamp device.

FIG. 12 is a partial sectional view for schematically exemplifying the vehicle lamp device 100.

As illustrated in FIG. 12, the vehicle lamp device 100 includes the vehicle luminaire 1, the casing 101, a cover 102, an optical element unit 103, a seal member 104, and the connector 105.

The casing 101 holds the mount portion 11. The casing 101 has a case shape that is open on one end side. For example, the casing 101 may be made of a resin that does not transmit light. The casing 101 has a bottom surface that is provided with an installation hole **101*a* into which a region of the mount portion 11, in which the bayonet 12 is provided, is inserted. The installation hole 101*a* has a peripheral edge that is provided with a recess into which the bayonet 12 provided on the mount portion 11 is inserted. Incidentally, a case where the installation hole 101*a* is directly provided in the casing 101 is exemplified; however, an installation member provided with the installation hole 101*a* may be provided on the casing 101**.

When the vehicle luminaire 1 is installed in the vehicle lamp device 100, the region of the mount portion 11, in which the bayonet 12 is provided, is inserted into the installation hole **101*a*, and the vehicle luminaire 1 is rotated. In this manner, the bayonet 12 is held in a fitting portion provided on the peripheral edge of the installation hole 101*a***. Such an installation method is referred to as twist-lock.

The cover 102 is provided to block an opening of the casing 101. The cover 102 may be made of a resin having translucency. The cover 102 may have a function of a lens or the like.

The light emitted from the vehicle luminaire 1 is incident to the optical element unit 103. The optical element unit 103 performs reflection, diffusion, guiding, or collecting of the light emitting from the vehicle luminaire 1, forming of a predetermined light distribution pattern, or the like. For example, the optical element unit 103 exemplified in FIG. 12 is a reflector. In this case, the optical element unit 103 reflects the light emitting from the vehicle luminaire 1 so as to form the predetermined light distribution pattern.

The seal member 104 is provided between the flange 13 and the casing 101. The seal member 104 may have an annular shape. The seal member 104 may be made of a material such as rubber or a silicone resin having elasticity.

When the vehicle luminaire 1 is installed in the casing 101, the seal member 104 is sandwiched between the flange 13 and the casing 101. Therefore, the seal member 104 seals an internal space of the casing 101. In addition, the bayonet 12 is pressed against the casing 101 due to an elastic force of the seal member 104. Therefore, it is possible to suppress separation of the vehicle luminaire 1 from the casing 101.

The connectors 105 are fit to ends of the plurality of power-supply terminals 31 that are exposed to the inside of the hole **15*b*. A power-supply or the like (not shown) is electrically connected to the connector 105. Therefore, the connector 105 is fit to the ends of the power-supply terminals 31, and thereby the power-supply (not shown) and the light-emitting element 22 are electrically connected to each other. In addition, the connector 105 is provided with a step region. In this manner, the seal member 105*a* is installed in the step region. The seal member 105*a* is provided to prevent water from infiltrating the inside of the hole 15*b*. When the connector 105 including a seal member 105*a* is inserted into the hole 15*b*, the hole 15*b* is sealed in a watertight manner. The seal member 105*a* may have an annular shape. The seal member 105*a* may be made of a material such as rubber or a silicone resin having elasticity. For example, the connector 105 may be bonded to an element on the socket 10** side by using an adhesive or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments may be combined mutually and may be carried out.

What is claimed is:

1. A vehicle luminaire comprising:

a flange;

a mount portion provided on one side of the flange;

a light-emitting unit that is provided on an end of the mount portion opposite to the flange side and includes at least one light-emitting element;

a holder which is provided on another side of the flange and into which a connector is insertable; and at least one first thermal radiation fin that is provided on the another side of the flange and extends from a peripheral edge of the flange toward the holder, wherein, in a direction in which the holder projects from the flange, a position of an end face of the holder opposite to the flange side is different from a position of a holder-side end of an end face of the first thermal radiation fin opposite to the flange side further comprising:

at least one second thermal radiation fin that extends along the peripheral edge of the flange and is provided in a direction intersecting a direction in which the first thermal radiation fin and the holder are aligned; and wherein the luminaire satisfies the following expression:

L2*a*>L1 and L3*a*>L1, wherein

L1 represents a distance between a surface of the flange and the end face of the holder opposite to the flange side, L2*a* represents a distance between the surface of the flange and an end of the end face of the first thermal radiation fin opposite to the holder side and opposite to the flange side, and L3*a* represents a distance between the surface of the flange and the end face of the second thermal radiation fin opposite to the flange side.

2. The luminaire according to claim 1, which satisfies the following expression:

L1>L2, wherein

L1 represents a distance between a surface of the flange and the end face of the holder opposite to the flange side, and L2 represents a distance between the surface of the flange and the holder-side end of the end face of the first thermal radiation fin opposite to the flange side.

3. The luminaire according to claim 2, which satisfies the following expression:

L2*a*>L2, wherein

L2*a* represents a distance between the surface of the flange and an end of the end face of the first thermal radiation fin opposite to the holder side and opposite to the flange side.

4. The luminaire according to claim 3, wherein the first thermal radiation fin has a step portion provided on the end face thereof opposite to the flange side.

5. The luminaire according to claim 3, wherein the first thermal radiation fin has a first inclined portion provided on the end face thereof opposite to the flange side.

6. The luminaire according to claim 2, wherein L2/L1 is 0.7.

7. The luminaire according to claim 1, wherein the second thermal radiation fin has a second inclined portion provided on a holder-side end face thereof opposite to the flange side.

8. The luminaire according to claim 7, which satisfies the following expression:

L1>L3, wherein

L1 represents a distance between a surface of the flange and the end face of the holder opposite to the flange side, and L3 represents a distance between the surface of the flange and an end face of the second thermal radiation fin opposite to the flange side.

9. The luminaire according to claim 8, which satisfies the following expression:

L1>L2, wherein

L1 represents a distance between the surface of the flange and the end face of the holder opposite to the flange side, and L2 represents a distance between the surface of the flange and the holder-side end of the end face of the first thermal radiation fin opposite to the flange side.

10. The luminaire according to claim 7, which satisfies the following expression:

L1≤L3*a*, wherein

L1 represents a distance between a surface of the flange and the end face of the holder opposite to the flange side, and L3*a* represents a distance between the surface of the flange and the end face of the second thermal radiation fin opposite to the flange side.

11. The luminaire according to claim 10, which satisfies the following expression:

L1>L2, wherein

L1 represents a distance between the surface of the flange and the end face of the holder opposite to the flange side, and L2 represents a distance between the surface of the flange and the holder-side end of the end face of the first thermal radiation fin opposite to the flange side.

12. The luminaire according to claim 7, wherein the holder is provided between the second thermal radiation fin and the second thermal radiation fin.

13. The luminaire according to claim 7, wherein the second thermal radiation fin includes a high thermal conductivity resin.

14. The luminaire according to claim 1, wherein the holder is provided between a center and a peripheral edge of a surface of the flange.

15. The luminaire according to claim 1, wherein the holder is provided in a central region on a surface of the flange.

16. The luminaire according to claim 1, wherein the holder has a cylindrical shape.

17. The luminaire according to claim 1, wherein the flange has a circular disk shape.

18. The luminaire according to claim 1, wherein the flange, the holder, and the first thermal radiation fin contain a high thermal conductivity resin.

19. A vehicle lamp device comprising:
the vehicle luminaire according to claim 1; and
a casing in which the vehicle luminaire is installed.

* * * * *